(12) United States Patent
Chiang et al.

(10) Patent No.: US 8,508,187 B2
(45) Date of Patent: Aug. 13, 2013

(54) INTERACTIVE CHARGING MANAGEMENT SYSTEM AND METHOD THEREOF

(75) Inventors: Wen-Shu Chiang, Hsinchu County (TW); Chin-Pin Chien, Hsinchu County (TW); An-Hung Lin, Taipei County (TW)

(73) Assignee: Industrial Technology Research Institute, Hsinchu (TW)

( * ) Notice: Subject to any disclaimer, the term of this patent is extended or adjusted under 35 U.S.C. 154(b) by 266 days.

(21) Appl. No.: 13/028,219

(22) Filed: Feb. 16, 2011

(65) Prior Publication Data

US 2012/0161699 A1    Jun. 28, 2012

(30) Foreign Application Priority Data

Dec. 22, 2010 (TW) .............................. 99145275 A (51) Int. Cl.
*H02J 7/00* (2006.01)
*B60K 6/20* (2007.10)

(52) U.S. Cl.
USPC .......................... 320/109; 320/160; 180/65.21

(58) Field of Classification Search
USPC ................................ 320/109, 160; 180/65.21
See application file for complete search history.

(56) References Cited

U.S. PATENT DOCUMENTS

| | | | |
|---|---|---|---|
| 4,347,575 A | | 8/1982 | Gurr et al. |
| 5,926,004 A | * | 7/1999 | Henze ........................... 320/109 |
| 6,037,751 A | * | 3/2000 | Klang ............................ 320/160 |
| 6,535,797 B1 | | 3/2003 | Bowles et al. |
| 6,751,562 B1 | | 6/2004 | Blackett et al. |
| 7,055,043 B2 | | 5/2006 | Anzai |
| 7,274,975 B2 | | 9/2007 | Miller |
| 7,590,472 B2 | | 9/2009 | Hakim et al. |
| 8,154,246 B1 | * | 4/2012 | Heitmann ...................... 320/109 |
| 2009/0174365 A1 | * | 7/2009 | Lowenthal et al. ........... 320/109 |
| 2010/0049396 A1 | | 2/2010 | Ferro et al. |
| 2011/0043165 A1 | * | 2/2011 | Kinser et al. ................... 320/109 |
| 2011/0227534 A1 | * | 9/2011 | Mitsutani ....................... 320/109 |

FOREIGN PATENT DOCUMENTS

| | | |
|---|---|---|
| TW | 561659 | 11/2003 |
| TW | I272465 | 2/2007 |

OTHER PUBLICATIONS

P.Mirandola et al, "User-Utility Interface Though the Home System: A New Opportunity to Optimize the Demand Control and Power Supply Service", appears in Metering Apparatus and Tariffs for Electricity Supply, 1992., Seventh International Conference, Issued on Nov. 17-19, 1992, p. 243-p. 247.

C.Roesener et al, "Internet-based Hybrid Demand Control System for Japanese Power Grid", 6th IEEE International Workshop on Factory Communication System WFCS2006, issued on Jun. 2006, p. 395-p. 400.

H.C.Chen et al, "A Study of Load-Shedding Scheme for Load Management of High Voltage Load Consumers", National Chin-Yi University of Technology, Academic Paper vol. 20, No. 2, issued on Dec. 2002, p. 101-p. 122.

* cited by examiner

*Primary Examiner* — M'Baye Diao
(74) *Attorney, Agent, or Firm* — Jianq Chyun IP Office (57) ABSTRACT

An interactive charging management system and a method thereof are provided. The method is applicable to a plurality of electric vehicles, and which includes dynamically adjusting usable power information respectively provided by a plurality of charging posts respectively corresponding to and coupled to the electric vehicles according to demand power information of the respective electric vehicles; and making the charging posts non-uniformly provide a plurality of charging powers to the respective electric vehicles according to the adjusted usable power information.

13 Claims, 7 Drawing Sheets

INTERACTIVE CHARGING MANAGEMENT SYSTEM AND METHOD THEREOF

CROSS-REFERENCE TO RELATED APPLICATION

This application claims the priority benefit of Taiwan application serial no. 99145275, filed on Dec. 22, 2010. The entirety of the above-mentioned patent application is hereby incorporated by reference herein and made a part of this specification.

BACKGROUND

1. Field of the Invention

The disclosure relates to a charging management scheme, more particularly, to an interactive charging management system suitable for electronic vehicles and a method thereof.

2. Description of the Related Art

Since the industrial revolution, the motors (engines) started based on the petrochemical energy sources resolve the problems of human traffic, but would cause the extremely serious air pollution, environmental and greenhouse effect problems. With soaring oil prices, the global scientists have been dedicated to seek a solution for energy sources and traffic. The development of electronic vehicles can settle the problems of waste gas, air pollution and greenhouse effect all came from and caused by a moving cars and motorcycles.

In general, the electronic vehicles including plug-in hybrid electric vehicles (PHEVs) can be charged by the charging posts located at the parking areas such as public and private parking areas, apartment building, etc. The current parking areas and apartment building need to make a contract capacity with Electric Power Company, so as to define a total power consumption (kVA). Once the actual power consumption is higher than the defined total power consumption, the outage (i.e. trip) is occurred.

It is known that the consumption of whole charging powers needs to be managed properly for some places located charging facilities relating to the electronic vehicles, so as to avoid the problem of outage due to over-consumption.

Figure 1:
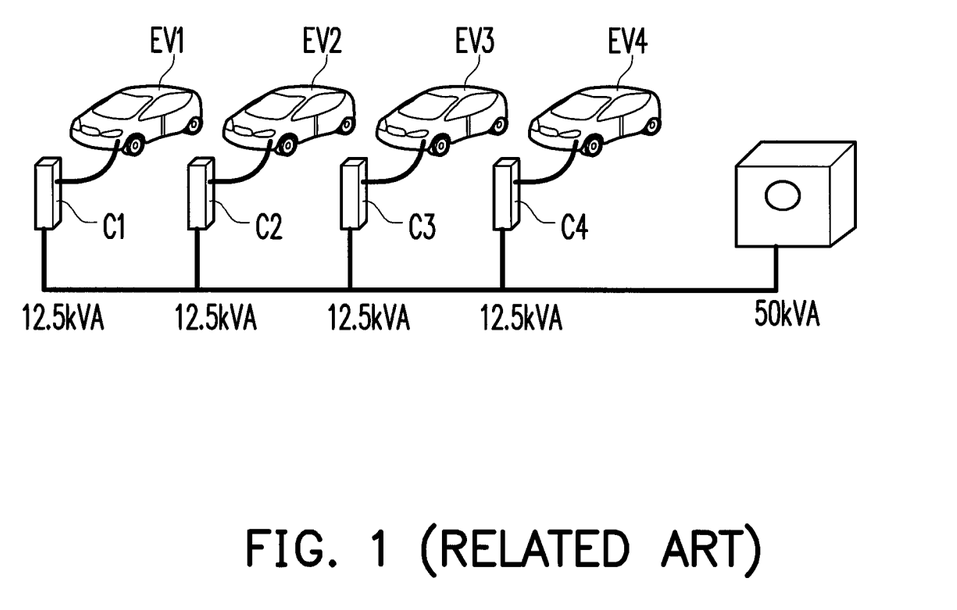
FIG. 1 is a diagram of the manner of traditional charging management relating to electronic vehicles.

The manner of traditional charging management adopts the concept of uniform distribution to settle the problem of outage due to over-consumption. For example, as shown in FIG. 1, if a contract capacity is 50 kVA made by a certain place with Electric Power Company, and four charging posts C1 to C4 are located at the certain place. Accordingly, when these four charging posts C1 to C4 are respectively coupled to or connected to the corresponding electronic vehicles EV1 to EV4, each of the charging posts C1 to C4 may only provide the charging power of 12.5 kVA (50 kVA/4) to the corresponding electronic vehicles EV1 to EV4. It is known that the manner of traditional charging management adopts the means of uniform distribution to settle the problem of outage in the condition of fixed AC power (for example, 110ACV or 220ACV).

However, since the charging demand of each of the electronic vehicles is different due to the residual power in the battery of each of the electronic vehicles is not the same, so the manner of traditional charging management which is adopted by the means of uniform distribution is not the optimization solution due to some electronic vehicles each with more residual power do not need more charging power.

SUMMARY

The disclosure provides an interactive charging management system including a first charging post, for providing a first usable power information and a first charging power; a first electric vehicle, coupled to the first charging post, the first electronic vehicle being charged according to the first usable power information and the first charging power both provided by the first charging post; and a far-end control center, coupled to the first charging post, for dynamically adjusting the first usable information according to a first demand power information of the first electronic vehicle, and thus changing the first charging power. The first electronic vehicle transmits the first demand power information to the far-end control center through the first charging post.

The disclosure also provides an interactive charging management method suitable for a plurality of electronic vehicles, and the interactive charging management method includes adjusting dynamically usable power information respectively provided by a plurality of charging posts respectively corresponding to and coupled to the electric vehicles according to demand power information of the respective electric vehicles; and making the charging posts non-uniformly provide a plurality of charging powers to the respective electric vehicles according to the adjusted usable power information.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 2:
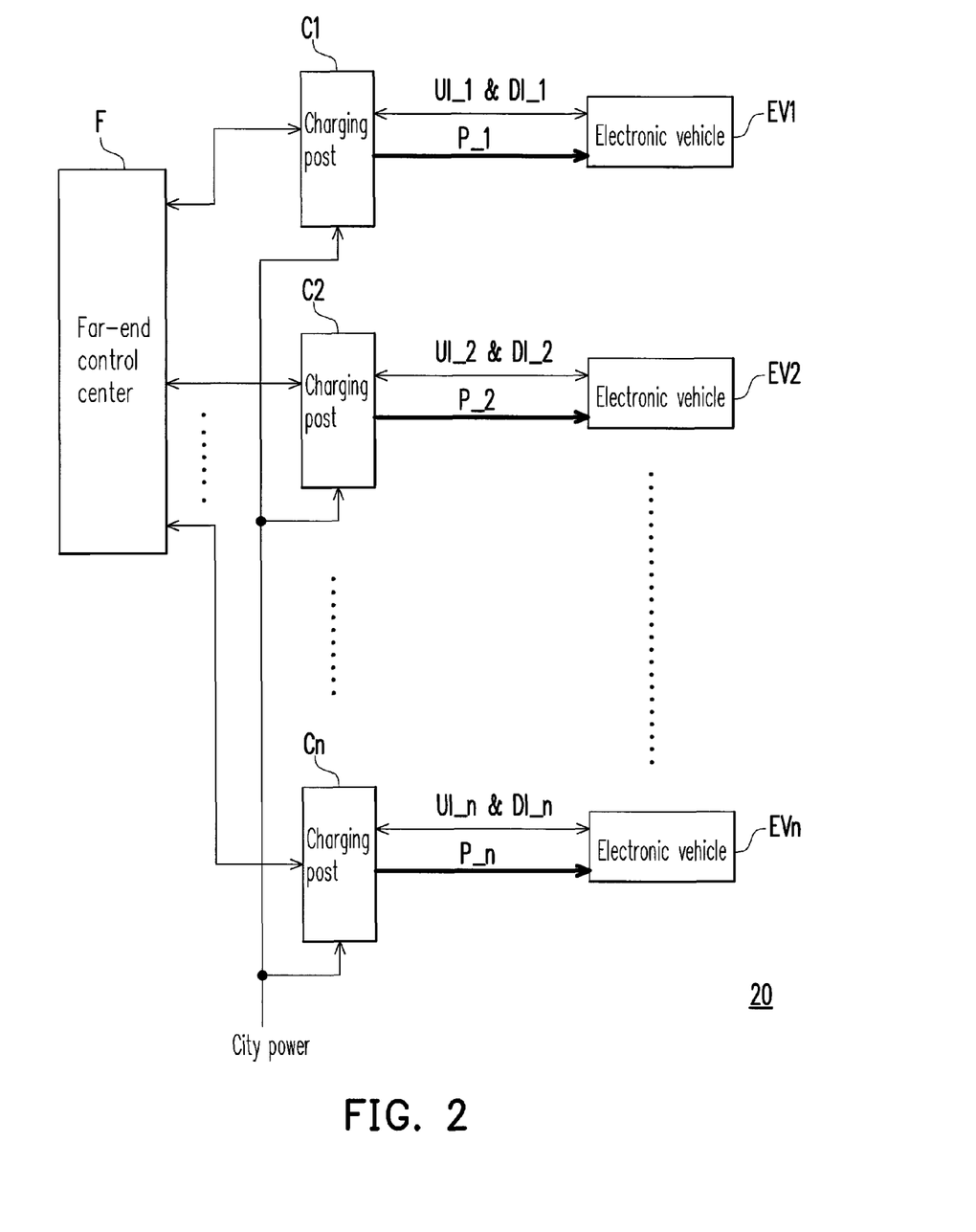
FIG. 2 is a diagram of an interactive charging management system according to an exemplary embodiment of the disclosure.

FIG. 2 is a diagram of an interactive charging management system 20 according to an exemplary embodiment of the disclosure. Referring to FIG. 2, the interactive charging management system 20 includes a plurality of electronic vehicles EV1 to EVn, a plurality of charging posts C1 to Cn, and a far-end control center F. The $i^{th}$ electronic vehicle EVi (i=1 to n) is charged according to a usable power information UI_i and a charging power P_i. For example, the $1^{st}$ electronic vehicle EV1 is charged according to the usable power information UI_1 and the charging power P_1, and so on.

In addition, the $i^{th}$ charging post Ci is coupled to the $i^{th}$ electronic vehicle EVi, and used for providing the usable power information IU_i and the charging power P_i to the $i^{th}$ electronic vehicle EVi. For example, the $1^{st}$ charging post C1 is coupled to the $1^{st}$ electronic vehicle EV1, and used for providing the usable power information UI_1 and the charging power P_1 to the $1^{st}$ electronic vehicle EV1, and so on.

Furthermore, the far-end control center F is coupled to all of the charging posts C1 to Cn, and used for dynamically adjusting the usable power information UI_1 to UI_n respectively provided by the charging posts C1 to Cn according to the demand power information DI_1 to DI_n of the respective electronic vehicles EV1 to EVn, and thus changing the charging powers P_1 to P_n respectively provided by the charging posts C1 to Cn. For example, the far-end control center F may dynamically adjust the usable power information UI_1 provided by the charging post C1 according to the demand power information DI_1 of the electronic vehicle EV1, and thus changing the charging power P_1 provided by the charging post C1, and so on.

In the present exemplary embodiment, since the charging structure of each of the electronic vehicles EV1 to EVn is similar, and the hardware structure of each of the charging posts C1 to Cn is also similar. Accordingly, a single electronic vehicle EV1 and a single charging post C1 are taken for explaining as below, and so on to analogize the other of electronic vehicles EV2 to EVn and the other of charging posts C2 to Cn.

Figure 3:
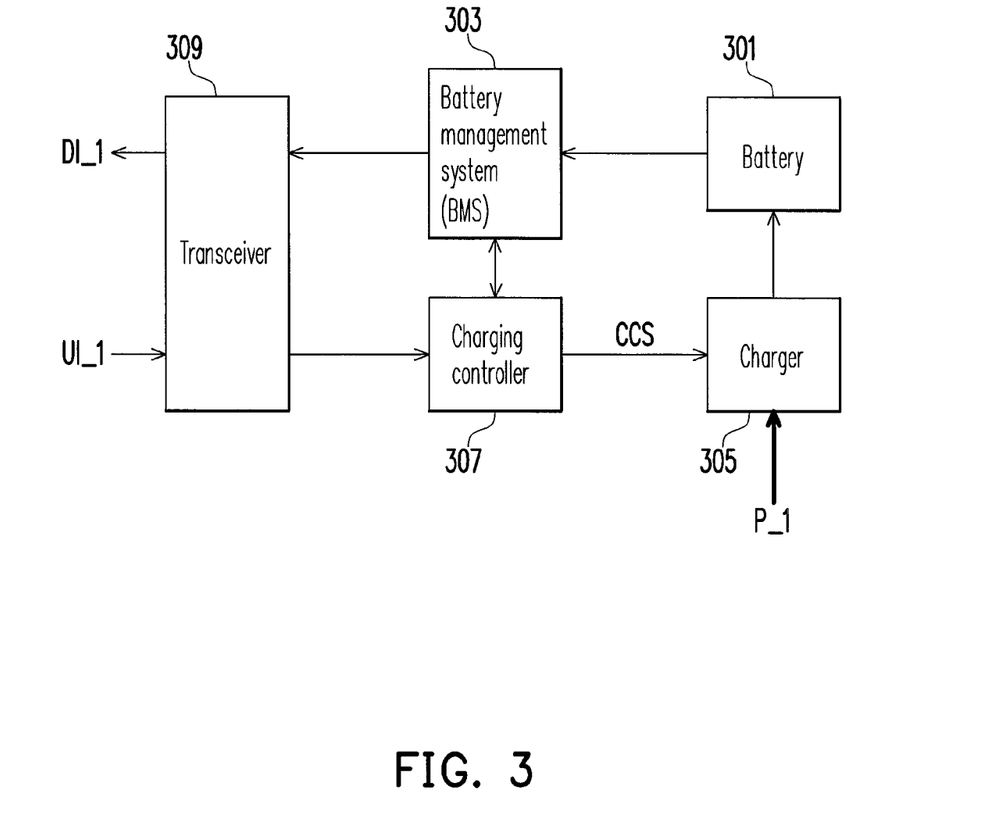
FIG. 3 is a diagram of a charging structure relating to an electronic vehicle according to an exemplary embodiment of the disclosure.

FIG. 3 is a diagram of a charging structure relating to the electronic vehicle EV1 according to an exemplary embodiment of the disclosure. Referring to FIG. 3, the electronic vehicle EV1 may include a battery 301, a battery management system (BMS) 303, a charger 305, a charging controller 307, and a transceiver 309. The BMS 303 is coupled to the battery 301. The BMS 303 is used for detecting a residual power of the battery 301, and determining a charging strategy and generating the demand power information DI_1 relating to the determined charging strategy according to the detected residual power and the usable power information UI_1 which is provided by the charging post C1 and corresponding to an upper limit value.

The charger 305 is coupled to the battery 301. The charger 305 is used for receiving the charging power P_1 provided by the charging post C1, and transmitting the received charging power P_1 to charge the battery 301 in response to a charging control signal CCS generated by the charging controller 307. The charging controller 307 is coupled to the BMS 303 and the charger 305. The charging controller 307 is used for generating the charging control signal CCS according to the charging strategy determined by the BMS 303, so as to control the charging power P_1 transmitted from the charger 305 to the battery 301. In other words, the charging controller 307 would adjust the charging power as the battery 301 is charged by the charger 305 according to the charging strategy determined by the BMS 303.

The transceiver 309 is coupled to the BMS 303 and the charging controller 307. The transceiver 309 is used for receiving and transmitting the usable power information UI_1 to the charging controller 307. Accordingly, the BMS 303 would obtain the usable power information UI_1 through the charging controller 307, and the BMS 307 further transmits the generated demand power information DI_1 to the charging post C1 through the transceiver 309. It is known that there is a bi-directional communication mechanism between the electronic vehicle EV1 and the charging post C1.

Figure 4:
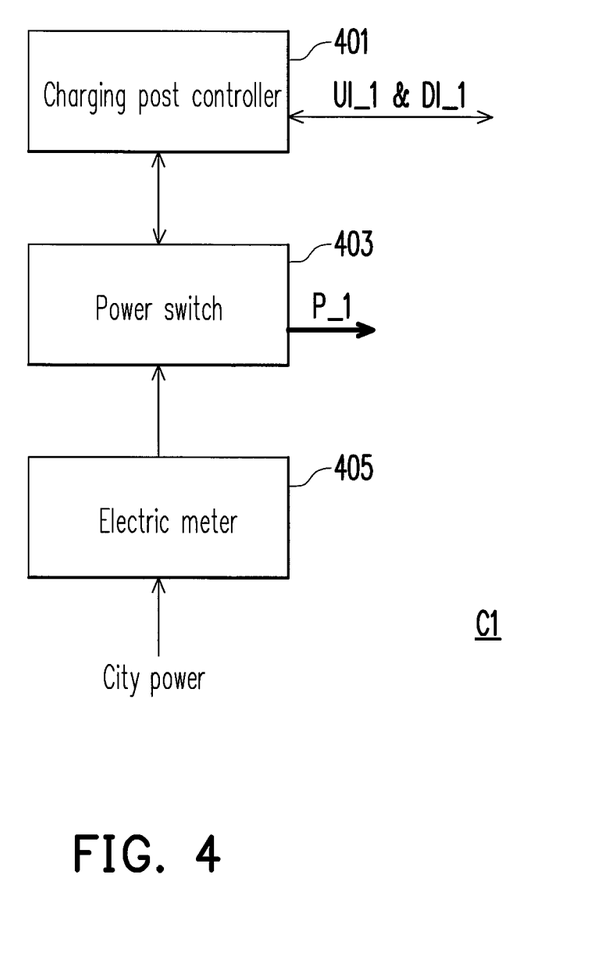
FIG. 4 is a diagram of a hardware structure relating to a charging post according to an exemplary embodiment of the disclosure.

In the other hands, FIG. 4 is a diagram of a hardware structure relating to the charging post C1 according to an exemplary embodiment of the disclosure. Referring to FIGS. 3 and 4, the charging post C1 may include a charging post controller 401, a power switch 403, and an electric meter 405. The charging post controller 401 is used for providing the usable power information UI_1 to the transceiver 309, and further used for receiving and transmitting the demand power information DI_1 transmitted by the transceiver 309 to the far-end control center F.

The power switch 403 is coupled between the charging post controller 401 and the charger 305. And, the charging post controller 401 is further used for controlling the operation (i.e. turned on or turned off) of the power switch 403 so as to determine whether to provide the charging power P_1 to the charger 305. The electric meter 405 is coupled to the power switch 403. The electric meter 405 is used for receiving a city power, and transmitting and measuring the charging power P_1 provided to the charger 305 when the charging post controller 401 controls the power switch 403 to be turned on.

In the present exemplary embodiment, when the charging power P_1 transmitted from the charging post C1 to the charger 305 is overloading, the charging post controller 401 further may control the power switch 403 to be turned off, and thus making the charging post C1 stop supplying power to protect the battery 301 and/or charger 305. On the contrary, the charging post controller 401 may make the charging post C1 continuously supplying power to charge the battery 301. Once the charging post C1 stopped supplying power due to overloading, the BMS 303 would adjust the previously determined charging strategy until the charging power P_1 transmitted from the charging post C1 to the charger 305 is not overloading.

Figure 5:
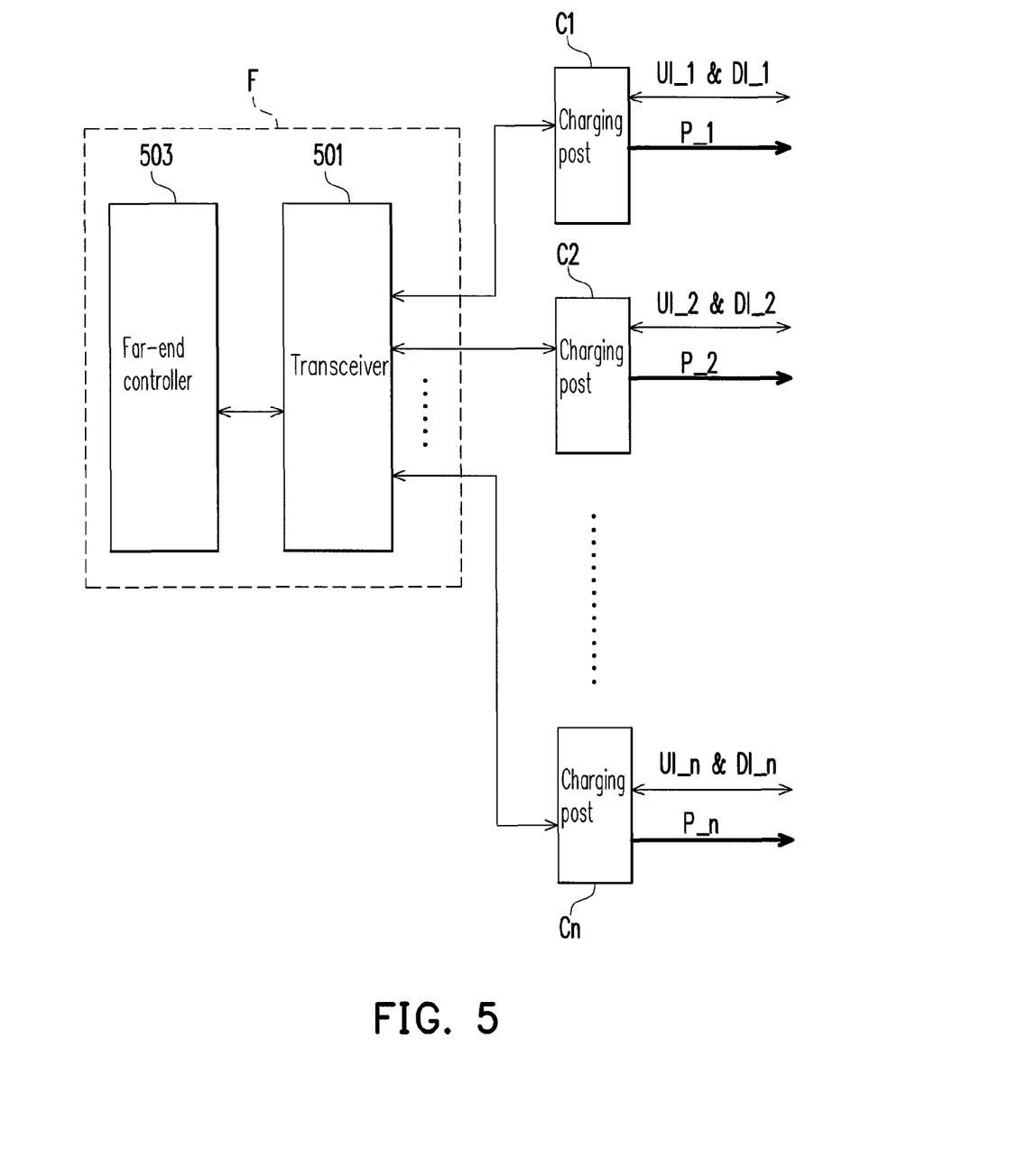
FIG. 5 is a diagram of a structure of a far-end control center according to an exemplary embodiment of the disclosure.

Furthermore, FIG. 5 is a diagram of a structure of the far-end control center F according to an exemplary embodiment of the disclosure. Referring to FIGS. 3 to 5, the far-end control center F may include a transceiver 501 and a far-end controller 503 coupled to the transceiver 501. Since all of the charging posts C1 to Cn would respectively receive and transmit the demand power information DI_1 to DI_n of the respective electronic vehicles EV1 to EVn to the far-end control center F. Accordingly, the transceiver 501 would receive the demand power information DI_1 to DI_n respectively transmitted by the charging posts C1 to Cn in a wire or wireless transmission manner including network, and then transmit the received demand power information DI_1 to DI_n to the far-end controller 503. Thus, the far-end controller 503 can dynamically adjust the usable power information UI_1 to UI_n respectively provided by the charging posts C1 to Cn through the transceiver 501 according to the demand power information DI_1 to DI_n received by the transceiver 501. Also, it is known that there is a bi-directional communication mechanism between the far-end control center F and each of the charging posts C1 to Cn.

In the present exemplary embodiment, the sum of the charging powers P_1 to P_n respectively provided by the charging posts C1 to Cn may be smaller than or equal to a total power consumption, where the total power consumption is determined by a contract capacity made with Electric Power Company. It is known that the far-end control center F would dynamically adjust the usable power information UI_1 to UI_n respectively provided by the charging posts C1 to Cn under the total power consumption, so as to avoid the problem of outage due to over-consumption. In addition, the charging powers P_1 to P_n respectively provided by the charging posts C1 to Cn may be different. In other words, when all of the charging posts C1 to Cn are respectively coupled to or connected to the corresponding electronic vehicles EV1 to EVn, each of the charging posts C1 to Cn may provide different (i.e. non-uniform) charging powers P_1 to P_n to the corresponding electronic vehicles EV1 to EVn.

Figure 6:
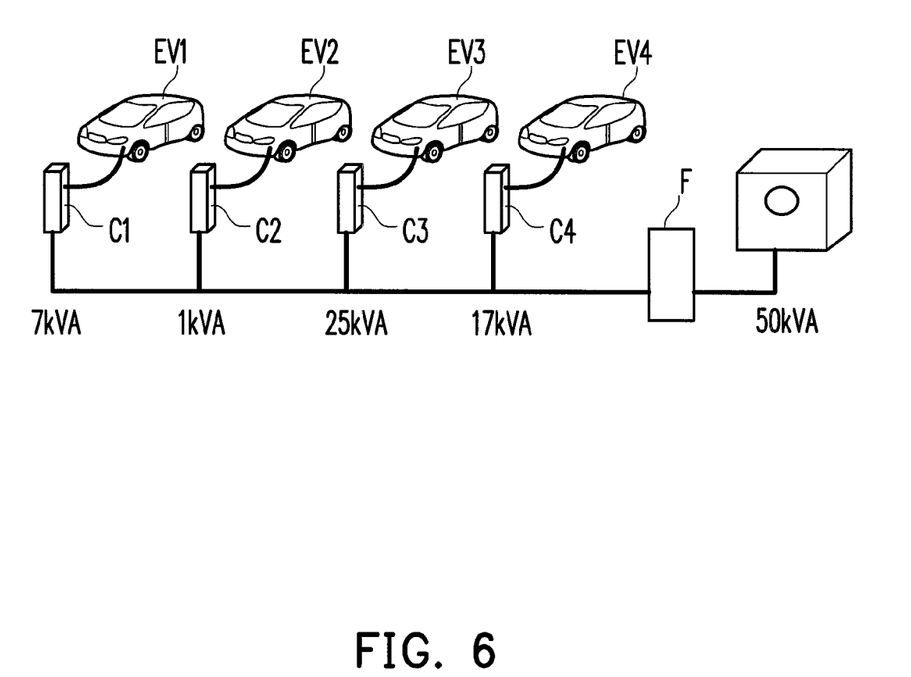
FIG. 6 is a diagram of the manner of charging management relating to electronic vehicles according to an exemplary embodiment of the disclosure.

To be specific, FIG. 6 is a diagram of the manner of charging management relating to electronic vehicles according to an exemplary embodiment of the disclosure. Referring to FIG. 6, if a contract capacity is 50 kVA made by a certain place with Electric Power Company, and four charging posts C1 to C4 are located at the certain place. Accordingly, when these four charging posts C1 to C4 are respectively coupled to or connected to the corresponding electronic vehicles EV1 to EV4, each of the charging posts C1 to C4 may non-uniformly provide, for example, the charging powers of 7 kVA, 1 kVA, 25 kVA and 17 kVA to the corresponding electronic vehicles EV1 to EV4 in response to the demand power information DI_1 to DI_4 of the respective electronic vehicles EV1 to EV4. It is obviously known that the present exemplary embodiment adopts the manner of non-uniform charging management to distribute different charging powers to the respective electronic vehicles, and thus to satisfy the actual charging demand of each of the electronic vehicles.

In other words, since the residual power in the battery 301 of each of the electronic vehicles EV1 to EVn is not the same, so the far-end control center F would non-uniformly distribute the charging powers P_1 to P_n to the respective electronic vehicles EV1 to EVn under the total power consumption (i.e. 50 kVA). Consequently, distributing more charging powers to the electronic vehicles each with less residual power (for example, the electronic vehicles EV3 and EV4), and distributing less charging powers to the electronic vehicles each with more residual power (for example, the electronic vehicles EV1 and EV2).

Figure 7:
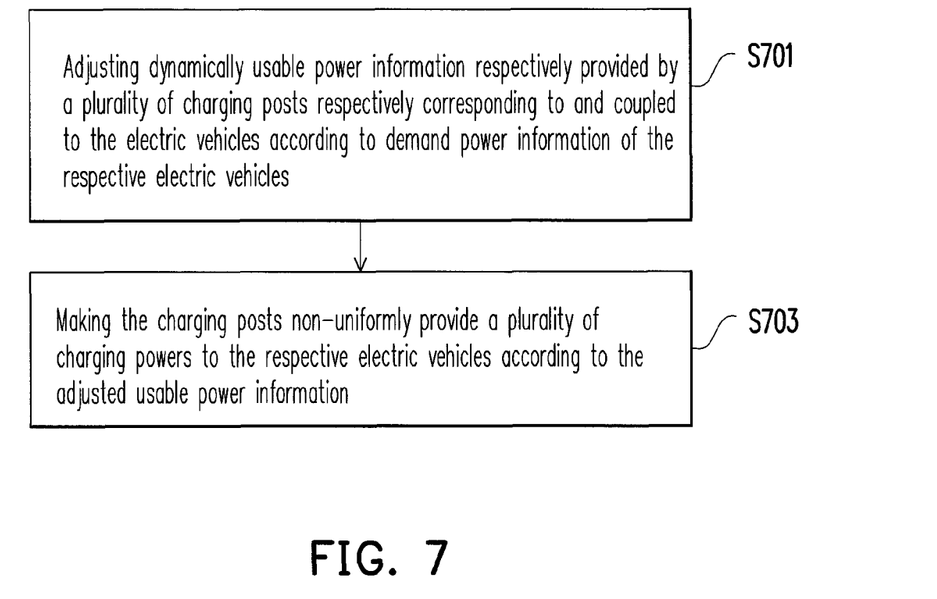
FIG. 7 is a flow chart of an interactive charging management method according to an exemplary embodiment of the disclosure.

Based on the disclosure/teaching of the above exemplary embodiments, FIG. 7 is a flow chart of an interactive charging management method according to an exemplary embodiment of the disclosure. Referring to FIG. 7, the interactive charging management method of the preset exemplary embodiment is suitable for (or applicable to) a plurality of electronic vehicles, and the interactive charging management method includes adjusting dynamically usable power information respectively provided by a plurality of charging posts respectively corresponding to and coupled to the electric vehicles according to demand power information of the respective electric vehicles (Step S701); and making the charging posts non-uniformly provide a plurality of charging powers to the respective electric vehicles according to the adjusted usable power information (Step S703). In the present exemplary embodiment, the sum of the charging powers provided by all of the charging posts may be smaller than or equal to a total power consumption, and the total power consumption is determined by a contract capacity made with Electric Power Company.

In summary, the interactive charging management system and method disclosed by the above exemplary embodiments may non-uniformly distribute charging power to the respective electronic vehicles under the total power consumption. Accordingly, it not only can be to satisfy the actual charging demand of each of the electronic vehicles, but also can be to avoid the problem of outage due to over-consumption.

It will be apparent to those skills in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An interactive charging management system, comprising:
    a first charging post, for providing a first usable power information and a first charging power;
    a first electronic vehicle, coupled to the first charging post, the first electronic vehicle being charged according to the first usable power information and the first charging power both provided by the first charging post; and
    a far-end control center, coupled to the first charging post, for dynamically adjusting the first usable information according to a first demand power information of the first electronic vehicle, and thus changing the first charging power,
    wherein the first electronic vehicle transmits the first demand power information to the far-end control center through the first charging post.

2. The interactive charging management system according to claim 1, further comprising:
    a second charging post, for providing a second usable power information and a second charging power; and
    a second electronic vehicle, coupled to the second charging post, the second electronic vehicle being charged according to the second usable power information and the second charging power both provided by the second charging post,
    wherein the far-end control center is further coupled to the second charging post for dynamically adjusting the second usable power information according to a second demand power information of the second electronic vehicle, and thus changing the second charging power; and
    wherein the second electronic vehicle transmits the second demand power information to the far-end control center through the second charging post.

3. The interactive charging management system according to claim 2, wherein the first electronic vehicle comprises:
    a battery;
    a battery management system (BMS), coupled to the battery, for detecting a residual power of the battery, and determining a charging strategy and generating the first demand power information relating to the charging strategy according to the residual power and the first usable power information;
    a charger, coupled to the battery, for receiving the first charging power, and transmitting the first charging power to charge the battery in response to a charging control signal;
    a charging controller, coupled to the BMS and the charger, for generating the charging control signal according to the charging strategy so as to control the first charging power transmitted from the charger to the battery; and
    a first transceiver, coupled to the BMS and the charging controller, for receiving and transmitting the first usable power information to the charging controller,
    wherein the BMS obtains the first usable power information through the charging controller, and the BMS further transmits the first demand power information through the first transceiver.

4. The interactive charging management system according to claim 3, wherein the first charging post comprises:
    a charging post controller, for providing the first usable power information to the first transceiver, and receiving and transmitting the first demand power information transmitted by the first transceiver to the far-end control center;

a power switch, coupled between the charging post controller and the charger, wherein the charging post controller further controls operation of the power switch so as to determine whether to provide the first charging power to the charger; and an electric meter, coupled to the power switch, for receiving a city power, and transmitting and measuring the first charging power provided to the charger when the charging post controller controls the power switch to be turned on.

5. The interactive charging management system according to claim 2, wherein the second electronic vehicle comprises:
a battery;
a battery management system (BMS), coupled to the battery, for detecting a residual power of the battery, and determining a charging strategy and generating the second demand power information relating to the charging strategy according to the residual power and the second usable power information;
a charger, coupled to the battery, for receiving the second charging power, and transmitting the second charging power to charge the battery in response to a charging control signal;
a charging controller, coupled to the BMS and the charger, for generating the charging control signal according to the charging strategy so as to control the second charging power transmitted from the charger to the battery; and
a first transceiver, coupled to the BMS and the charging controller, for receiving and transmitting the second usable power information to the charging controller, wherein the BMS obtains the second usable power information through the charging controller, and the BMS further transmits the second demand power information through the first transceiver.

6. The interactive charging management system according to claim 5, wherein the second charging post comprises:
a charging post controller, for providing the second usable power information to the first transceiver, and receiving and transmitting the second demand power information transmitted by the first transceiver to the far-end control center;
a power switch, coupled between the charging post controller and the charger, wherein the charging post controller further controls operation of the power switch so as to determine whether to provide the second charging power to the charger; and
an electric meter, coupled to the power switch, for receiving a city power, and transmitting and measuring the second charging power provided to the charger when the charging post controller controls the power switch to be turned on.

7. The interactive charging management system according to claim 2, wherein the first charging post is further for receiving and transmitting the first demand power information to the far-end control center, the second charging post is further for receiving and transmitting the second demand power information to the far-end control center, and the far-end control center comprises:
a second transceiver, for receiving the first and the second demand power information respectively transmitted by the first and the second charging posts; and
a far-end controller, coupled to the second transceiver, wherein the far-end controller dynamically adjusts the first and the second usable power information respectively provided by the first and the second charging posts through the second transceiver according to the first and the second demand power information received by the second transceiver.

8. The interactive charging management system according to claim 2, wherein a sum of the first and the second charging powers respectively provided by the first and the second charging posts is smaller than a total power consumption.

9. The interactive charging management system according to claim 8, wherein the total power consumption is determined by a contract capacity.

10. The interactive charging management system according to claim 2, wherein the first and the second charging powers respectively provided by the first and the second charging posts are different.

11. An interactive charging management method, suitable for a plurality of electronic vehicles, and the interactive charging management method comprising:
adjusting dynamically usable power information respectively provided by a plurality of charging posts respectively corresponding to and coupled to the electronic vehicles according to demand power information of the respective electronic vehicles; and
making the charging posts non-uniformly provide a plurality of charging powers to the respective electronic vehicles according to the adjusted usable power information.

12. The interactive charging management method according to claim 11, wherein a sum of the charging powers is smaller than a total power consumption.

13. The interactive charging management method according to claim 11, wherein the total power consumption is determined by a contract capacity.

* * * * *